(12) United States Patent
Bernhardt et al.

(10) Patent No.: US 7,008,168 B2
(45) Date of Patent: Mar. 7, 2006

(54) IMPLEMENT ATTACHMENT INTERFACE FOR THE COUPLING OF OPERATING IMPLEMENTS TO A UTILITY VEHICLE AND VALVE ARRANGEMENT

(75) Inventors: Gerd Bernhardt, Hänichen (DE); Sergiy Fedotov, Dresden (DE); Ruslan Rudik, Dresden (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/651,774

(22) Filed: Aug. 29, 2003

(65) Prior Publication Data

US 2004/0079224 A1   Apr. 29, 2004

(30) Foreign Application Priority Data

Oct. 9, 2002   (DE) ................................ 102 47 058

(51) Int. Cl.
*B66F 11/00* (2006.01)
(52) U.S. Cl. .......................... 414/703; 91/526; 91/531; 172/272; 414/917
(58) Field of Classification Search ................ 414/703, 414/917; 172/272, 699, 709; 91/508, 526, 91/531
See application file for complete search history.

(56) References Cited

U.S. PATENT DOCUMENTS 2,622,749 A * 12/1952 Stuhr .......................... 414/687
3,432,184 A    3/1969 Tweedy
4,059,283 A   11/1977 Shelton ....................... 280/461
2002/0125018 A1  9/2002 Bernhardt et al.
2002/0134558 A1  9/2002 Bernhardt et al.

FOREIGN PATENT DOCUMENTS

| AT | 272721 | | 7/1969 | |
| DE | 947343 | * | 8/1956 | .................. 91/508 |
| DE | 196 37 547 A 1 | | 3/1998 | |
| DE | 199 51 840 A 1 | | 5/2001 | |
| RU | 197709 | * | 9/1977 | .................. 91/508 |

* cited by examiner

*Primary Examiner*—Donald W. Underwood (57) ABSTRACT

An implement attachment interface is described, that is used for the coupling of operating implements to a utility vehicle, and that contains six double-acting hydraulic cylinders, that are adjustable in length and which are arranged in the manner of a hexapod between the utility vehicle and a coupling frame. This contains two upper hydraulic cylinders that are arranged alongside each other and extend in a direction converging towards each other, two lower hydraulic cylinders arranged alongside each other and converging towards each other as well as two hydraulic cylinders at the sides. According to the invention means are provided that for a pendulous movement to the right the lower right hydraulic cylinder and the upper left hydraulic cylinder extend synchronously and the lower left hydraulic cylinder and the upper right hydraulic cylinder are retracted synchronously. For a pendulous movement to the left the hydraulic cylinders operate in the opposite direction. Upon a deflection of the implement to the side the result thereby is in each of the diametrically opposite upper and lower hydraulic cylinders a simultaneous and equal change in length. Thereby the hydraulic cylinders interacting in this movement experience retraction strokes that are equal to the extension strokes.

12 Claims, 4 Drawing Sheets

IMPLEMENT ATTACHMENT INTERFACE FOR THE COUPLING OF OPERATING IMPLEMENTS TO A UTILITY VEHICLE AND VALVE ARRANGEMENT

FIELD OF THE INVENTION

The invention concerns an implement attachment interface for the coupling of operating implements to a utility vehicle with six double-acting hydraulic cylinders that are adjustable in length and that are arranged in the manner of a hexapod between the utility vehicle and a coupling frame that is equipped with attaching means for the fastening of the operating implements. Furthermore the invention concerns a valve arrangement for such an implement attachment interface.

BACKGROUND OF THE INVENTION

Usually agricultural tractors contain in their rear region a three-point attachment arrangement consisting of two lower steering arms at the sides and a central upper steering arm. An operating implement can be coupled to the steering arms. They can be repositioned in the vertical direction by hydraulic cylinders, in order to raise or lower the operating implement. A free deflection to the side is possible within certain limits that may be limited or prevented by side stabilizers. The ability to move to the side is particularly important during plowing, since the plow should not be fastened rigidly to the tractor in the horizontal direction. Rather the plow should be uncoupled from the steering movements of the tractor by a free pendulous movement to the side of the implement attachment interface. Here the horizontal guidance of the plow is the result of the convergence of the lower steering arms, whose lines of action intersect in a guide point (August Van der Beek: "Die Lage des ideellen Fuehrungspunktes und der Zugkraftbedarf beim Pfluegen" ("The Position of the Ideal Guide Point and the Towing Force Required During Plowing"), "Grundlagen der Landtechnik" (Fundamentals of Agricultural Technology (1983) Number 1, Page 10 to 13). On the other hand the plow is connected rigidly with the tractor in the vertical direction or can be repositioned to pre-determined values with the use of a control arrangement, in order to maintain a desired depth of furrow.

DE-A-199 51 840 describes an attachment interface for the coupling of operating implements to a utility vehicle that is provided with a coupling frame and six hydraulic cylinders that can be repositioned in length. Each of the first ends of the hydraulic cylinders are connected in joints to the utility vehicle and each of the second ends are connected in joints to the coupling frame. The hydraulic cylinders are arranged in closed kinematic linkages, in particular according to the manner of a hexapod, in which the connecting elements engage in the corners of a frame side triangle or a vehicle side triangle. This arrangement of the connecting elements makes possible movements of the coupling frame and the operating implement in six degrees of freedom. In order to reposition the operating implement relative to the utility vehicle the lengths of the hydraulic cylinders can be adjusted largely independent of each other. Here the relationship of the lengths to each other can be adjusted as desired by means of an appropriate control arrangement. With this hexapod arrangement a free sideways movement with a fixed vertical position is not directly possible, since with all hydraulic cylinders switched to a free condition the repositioning to a fixed, pre-determined vertical position is not possible. If, on the other hand, only the two upper and the two lower hydraulic cylinders are switched to a free condition and the two hydraulic cylinders at the sides are switched to a rigid condition, then the plow can rotate during the operation about an axis extending in the longitudinal direction of the vehicle as a result of forces applied to it, which considerably impairs the result of the operation.

SUMMARY OF THE INVENTION

The problem underlying the invention is seen in the need to define an implement attachment interface as well as a valve arrangement of the type cited initially that make possible a free sideways pendulous movement with a fixed height adjustment (floating position). Here the coupling frame should not rotate about a longitudinal axis of the vehicle.

The implement attachment interface according to the invention is used to couple operating implements to a utility vehicle and contains six double-acting hydraulic cylinders that can be adjusted in length, that are arranged in the manner of a hexapod between the utility vehicle and a coupling frame, which is equipped with coupling means for the fastening of the operating implements. The points of attachment in joints of the hydraulic cylinders are generally located in the corners of a triangle on the side of the vehicle as well as in the corners of a triangle on the side of the frame. Two upper hydraulic cylinders are arranged alongside each other that extend in a converging direction from the vehicle, two lower hydraulic cylinders that extend alongside each other in a converging direction from the frame as well as two hydraulic cylinders at the sides are provided. According to the invention means are provided that assure that for a pendulous movement to the right the lower right hydraulic cylinder and the upper left hydraulic cylinder extend synchronously and the lower left hydraulic cylinder and the upper right hydraulic cylinder retract synchronously and that for a pendulous movement to the left the lower right hydraulic cylinder and the upper left hydraulic cylinder retract synchronously, and the lower left hydraulic cylinder and the upper right hydraulic cylinder extend synchronously. Thereby upon a deflection to the side of the operating implement the result is therefore a simultaneous and equal change in length in the diametrically opposite upper and lower hydraulic cylinders. Thereby in the hydraulic cylinders involved the retraction strokes are equal to the extension strokes.

The synchronous movement of the hydraulic cylinders can fundamentally be influenced actively by sideways forces that are transmitted from the operating implement to the tractor and can be measured by appropriate sensors. However it is particularly advantageous if the synchronous movement occurs passively and no additional measurement and control devices are required. According to a particularly advantageous further development of the invention a valve arrangement is used for the passive guidance that establishes appropriate connections between the chambers of the hydraulic cylinders for the establishment of the floating position. If the floating position is not desired, these connections are interrupted or blocked.

In the attachment interface known from DE-A-199 51 840 the lengths of the hydraulic cylinders can be defined on the basis of target value inputs (no floating position) in order to bring the operating implement into a desired position. For this purpose a control valve arrangement is provided that may be composed of several valve modules, where each hydraulic cylinder is associated with a valve module. If the present invention is applied to this known arrangement it is particularly advantageous for a space saving and low cost layout to integrate the valve arrangement used for the floating position into the control valve arrangement.

Each hydraulic cylinder is associated to great advantage with a separate valve module that contains on the one hand control valves of the control valve arrangement to actively influence the associated hydraulic cylinders and into which, on the other hand, elements of the valve arrangement for the floating function are integrated. The valve modules may be combined into a valve block that is mounted, for example, on the rear of the utility vehicle. The individual valve modules may be mounted, for example, alongside each other and combined to a building block and sealed against each other in such a way that supply lines that lead to a source of hydraulic pressure and to an unpressurized reservoir, extend through the building block, so that thereby the cost of separate external lines is reduced.

In order to keep manufacturing costs low, there also is an advantage in configuring the individual valve modules largely in an identical manner which does not present any difficulty with respect to the control valves. As regards the valve arrangements for the floating function, however, varying requirements are applied to the valve modules. In order to meet these requirements and in order to attain a largely equal configuration of the valve modules, all valve modules can be provided with identical hydraulic bores that are closed by blind screws or blind plugs or are provided with corresponding valves as a function of the characteristics required.

A configuration according to the invention provides that the means supplied for the floating position contain a valve arrangement which, in order to make possible a free movement to the side (floating position), connects the first chamber of the upper right hydraulic cylinder with the first chamber of the lower right hydraulic cylinder as well as the first chamber of the upper left hydraulic cylinder with the first chamber of the lower left hydraulic cylinder as well as the second chamber of the upper right hydraulic cylinder with the second chamber of the upper left hydraulic cylinder as well as the second chamber of the lower right hydraulic cylinder with the second chamber of the lower left hydraulic cylinder with each other. Each of the first chambers as well as each of the second chambers may be either the rod end chamber or the piston end chamber of the hydraulic cylinder. An arrangement that has proven particularly reliable is an arrangement in which each of the first chambers is the piston end chamber and each of the second chambers is the rod end chamber of the associated hydraulic cylinder.

When the connections are open the result is a floating position that permits a sideways pendulous movement of the operating implement relative to the utility vehicle. Thereby the two hydraulic cylinders at the sides are not influenced by the valve arrangement that is used for the adjustment of the floating position. During the floating position these hydraulic cylinders are either operating synchronously or switched to a rigid condition, in which their chambers are blocked.

It may be difficult to match the volumes of the hydraulic cylinders correctly to each other for manufacturing reasons, therefore as a result in such a closed system when it is in the floating position negative pressures may occur. These negative pressures can increase the leakage, affect the characteristics of the hydraulic fluid unfavorably and sometimes lead to cavitation in the system. For a reliable operation it is therefore advantageous to provide topping off valves that make possible a flow of fluid from the reservoir to the hydraulic cylinders, as long as the pressure in a hydraulic cylinder chamber falls below a pre-determined pressure. According to a preferred further development of the invention a topping-off valve is provided for this purpose between at least one chamber of one of the hydraulic cylinders and a reservoir that permits a flow of fluid from the fluid reservoir to the hydraulic cylinder. Preferably the piston end chamber as well as the rod end chamber of each of the hydraulic cylinders is connected over a topping-off valve with the fluid reservoir, the topping-off valve may be configured as a check valve.

It is also appropriate that the piston end chamber as well as the rod end chamber of each of the hydraulic cylinders is connected with the fluid reservoir over an associated follower valve.

Preferably the extension stroke and the retraction stroke of the hydraulic cylinder is limited by defined stops. Here the result is stops that are laid out according to a preferred further development of the invention in such a way that they limit the sideways movement of the implement attachment interface relative to the longitudinal direction of the vehicle to a pre-determined pendulous movement to both sides and/or a pre-determined pendulous angle. Here the pendulous movement may have a value of, for example, 400 mm. This means that the coupling frame can be shifted to the side during the floating position from a central basic position to the left as well as to the right through 200 mm in each direction. In its central basic position the coupling frame occupies a basic position in which it is generally oriented perpendicular to the direction of operation and the hydraulic cylinders occupy an intermediate retracted position. During the pendulous movement the coupling frame rotates about a generally vertical axis and moves from its basic position through an angle of pendulous motion (inclination of the coupling frame relative to a plane extending transverse to the longitudinal direction of the vehicle). The magnitude of this angle of pendulous motion can also be limited to pre-determined values by a corresponding layout of the cylinder stops, for example, to 4° to 6°. The boundary of the pendulous motion and/or the pendulous angle is reached at a condition at, for example, in which a pair of cylinders, consisting of the upper right and the lower right hydraulic cylinder or the upper left and the lower left hydraulic cylinder are extended to a certain stroke region, limited by the cylinder stops. This stroke region must be overcome by a control arrangement of the implement attachment interface during the mounting of the implement, so that a useful pendulous motion is maintained thereby (as a rule 175 to 200 mm).

For safety reasons and for reasons of simplifying the operation there is a particular advantage in controlling the horizontal floating position as a function of the actual operation. For this purpose a preferred further development of the invention provides for the detection of at least a stroke height detection signal that represents the actual stroke height of the coupling frame or the operating implement. Control arrangements are activated or deactivated when a pre-determined stroke height is not reached (for example, upon the insertion of a first plowshare of a multiple share plow into the ground) or is exceeded and the horizontal floating position is maintained automatically. Thereby the operator is relieved of his duties considerably, since he need only engage and disengage the automatic operation of the floating position at the beginning and the end of the ground breaking operation.

Preferably a first input arrangement is provided through which the horizontal floating position can be activated and/or deactivated. This may be an activation switch that is used for a usual automatic turning device at the end of a field. In addition or alternately thereto it is also advantageous that a second input arrangement be provided by means of which a height of the stroke of the coupling frame or the operating implement can be provided as input for a target value. These input arrangements are appropriately located at the operator's platform, in particular on the operator's desk in the operator's cab.

The valve arrangement according to the invention contains chamber connections that can be connected with each of the first and the second chamber of the upper and the lower hydraulic cylinders. Furthermore it contains valves through which the first chamber of the upper right can selectively be connected with the first chamber of the lower right hydraulic cylinder as well as the first chamber of the upper left hydraulic cylinder with the first chamber of the lower left hydraulic cylinder as well as the second chamber of the upper right hydraulic cylinder with the second chamber of the upper left hydraulic cylinder as well as the second chamber of the lower right with the second chamber of the lower left hydraulic cylinder can selectively be connected to each other. The valves can be opened in unison by a floating position signal.

Preferably the valve arrangement contains a sump connection that can be connected with a fluid reservoir, as well as at least one topping-off valve that makes possible a fluid flow from the sump connection to a chamber connection.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
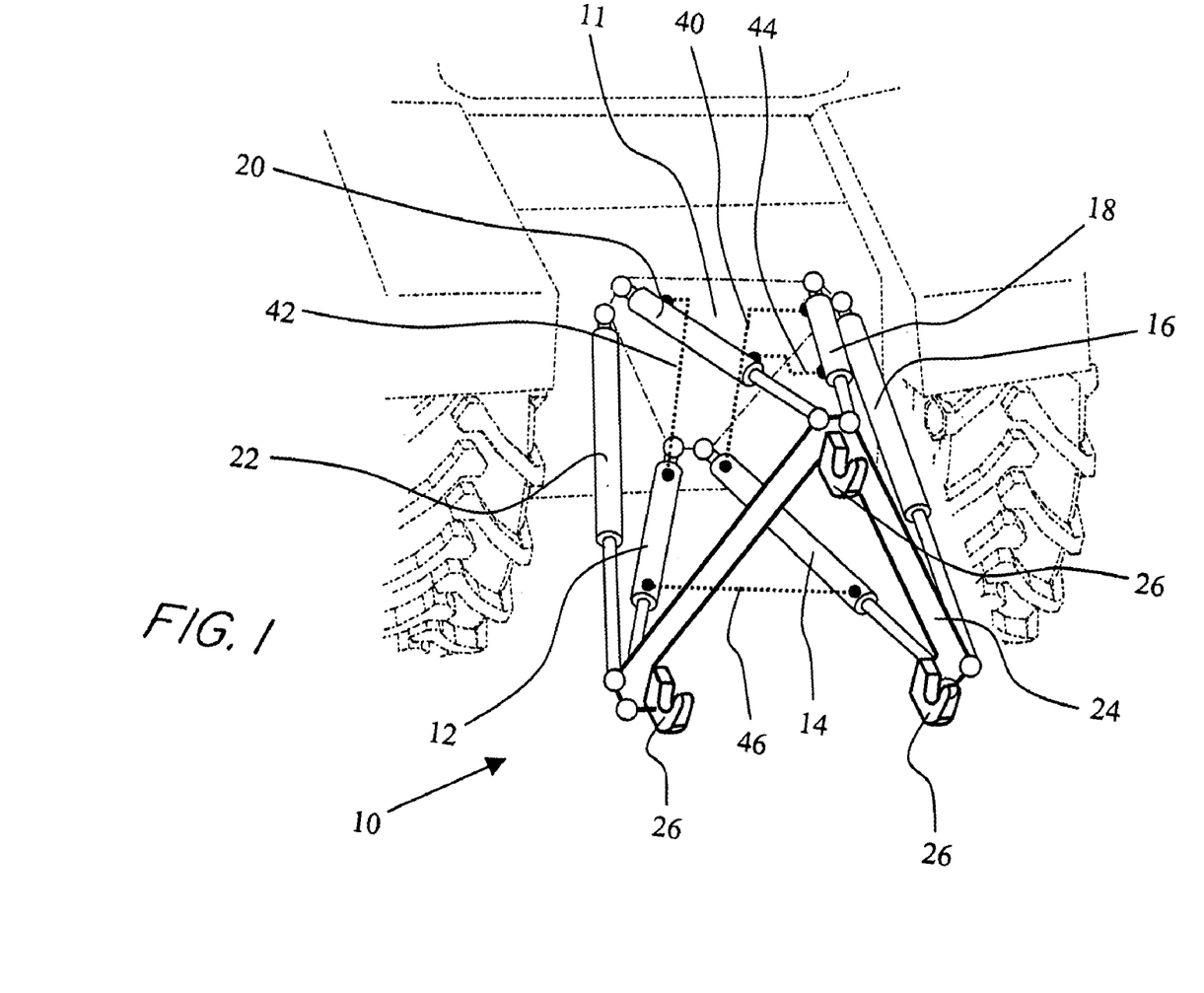
FIG. 1 shows a perspective view of the rear of an agricultural tractor with a first implement attachment interface according to the invention.
Figure 2:
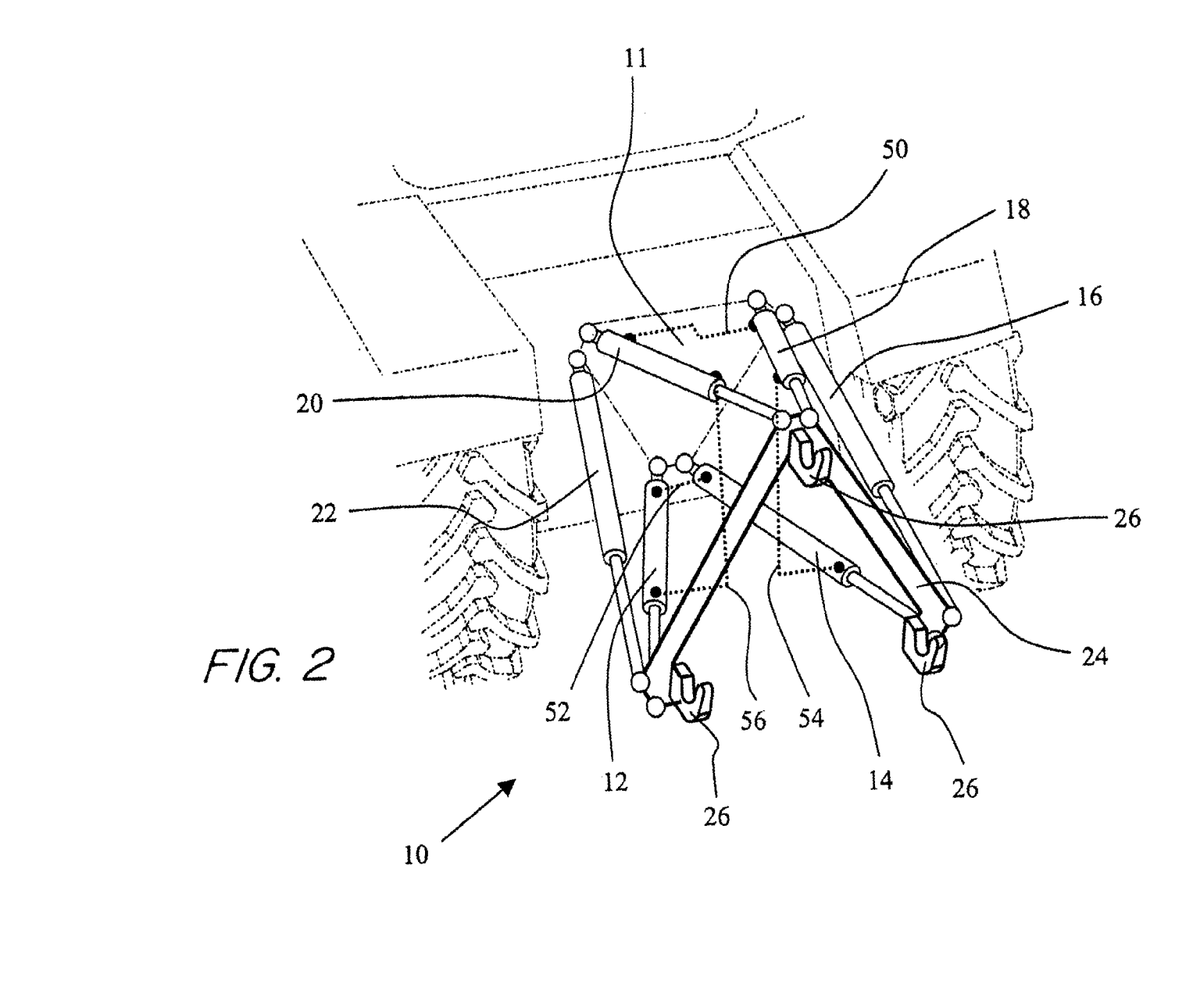
FIG. 2 shows a perspective view of the rear of an agricultural tractor with a second implement attachment interface according to the invention.

FIGS. 1 and 2 each show an implement attachment interface 10 that contains six hydraulic cylinders 12, 14, 16, 18, 20, 22, each of whose first ends is fastened in joints to the rear 11 of the vehicle, for example, to the differential housing and each of whose second ends is fastened in joints to a coupling frame 24. The hydraulic cylinders 12, 14, 16, 18, 20, 22 are arranged in closed kinematic linkages in the manner of a hexapod that engage generally in the corners of a triangle on the side of the vehicle as well as in the corners of a triangle on the side of the frame. Two upper hydraulic cylinders 18, 20 arranged alongside each other are provided that converge towards each other from the vehicle, two lower hydraulic cylinders 12, 14 arranged alongside each other, converging towards each other from the frame, as well as two hydraulic cylinders 16, 22 at the sides. The hydraulic cylinders are arranged symmetrically, where the two upper and the two lower hydraulic cylinders 18, 20 and 12, 14 form triangles. The hydraulic cylinders 16, 22 at the sides operate essentially as lifting cylinders through which an attached implement, not shown, can be raised and lowered.

The coupling frame 24 consists of two V-shaped legs that are connected to each other in an upper vertex and diverge in wedge-shaped manner downward from each other. The upper vertex and the two lower free ends of the coupling frame 24 form a triangle whose corners engage on the one hand the second ends of the hydraulic cylinders 12, 14, 16, 18, 20, 22 and on which, on the other hand, coupling hooks 26 that open upward are fastened, that are used for fastening operating implements.

The hydraulic cylinders 12, 14, 16, 18, 20, 22 used here are double-acting hydraulic cylinders each of whose rod end chambers and piston end chambers are connected with a control valve arrangement, that is used for the length adjustment of the hydraulic cylinders 12, 14, 16, 18, 20, 22 on the basis of target value inputs, in order to move the coupling frame 24 and with it the operating implement into a desired position and orientation as is described in DE-A-199 51 840.

Figure 3:
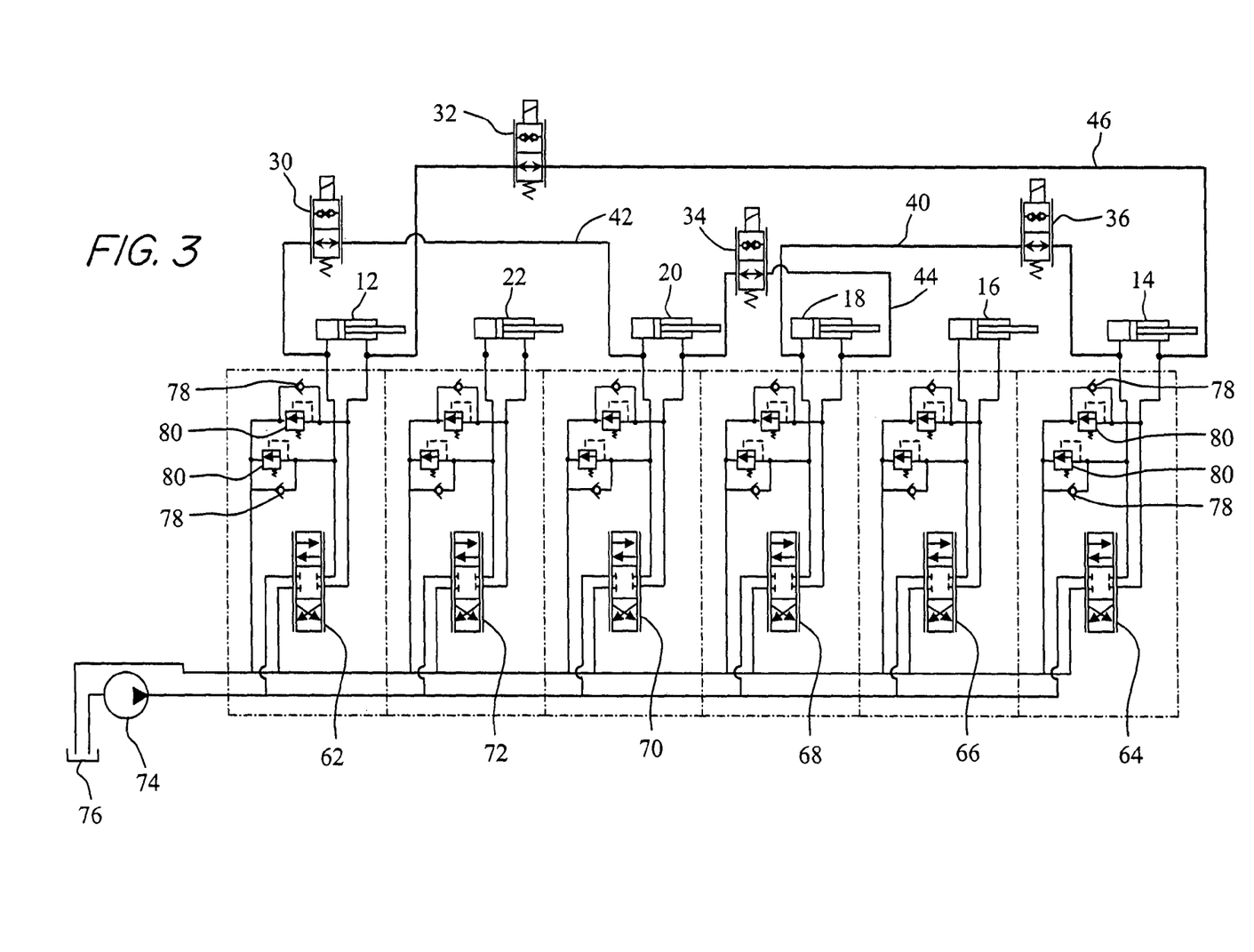
FIG. 3 shows a hydraulic circuit diagram of a valve arrangement according to the invention.

In order to engage a floating position a valve arrangement is provided that generally contains four electromagnetically controlled 2/2 way seat valves 30, 32, 34, 36 that are shown in FIG. 3. By actuating these seat valves 30, 32, 34, 36 electrically certain piston end chambers and rod end chambers of the hydraulic cylinders 12, 14, 18, 20 can be connected with each other or separated from each other.

Which of the piston end chambers and rod end chambers are to be connected with each other for a floating position is shown by dashed lines in FIGS. 1 and 2, in which two different embodiments are shown. According to FIG. 1 the four seat valves 30, 32, 34, 36 are arranged in the following connecting lines 40, 42, 44, 46.

The seat valve 36 is located in the connecting line 40 between the piston end chamber of the upper right hydraulic cylinder 18 and the piston end chamber of the lower right hydraulic cylinder 14. The seat valve 30 is located in the connecting line 42 between the piston end chamber of the upper left hydraulic cylinder 20 and the piston end chamber of the lower left hydraulic cylinder 12. The seat valve 34 is located in the connecting line 44 between the rod end chamber of the upper right hydraulic cylinder 18 and the rod end chamber of the upper left hydraulic cylinder 20. The seat valve 32 is located in the connecting line 46 between the rod end chamber of the lower right hydraulic cylinder 14 and the rod end chamber of the lower left hydraulic cylinder 12.

If all seat valves 30, 32, 34, 36 are open and the control valves 62, 70, 68, 64 are closed, these will be explained later, then the result is a sideways pendulous movement that is induced by external forces with a fluid exchange between the hydraulic cylinders 12, 14, 18, 20. During the sideways pendulous movement to the left the hydraulic cylinders 12 and 18 are extended synchronously and the hydraulic cylinders 14 and 20 are retracted synchronously through the same stroke. During the sideways pendulous movement to the right the result is a movement of the cylinders in the opposite direction. Thereby the difference in stroke of the upper right hydraulic cylinder 18 is equal to the stroke difference of the lower left hydraulic cylinder 12 and is equal to the negative value of the stroke difference of the upper left hydraulic cylinder 20 as well as the lower right hydraulic cylinder 14.

An alternative arrangement to the above is shown in FIG. 2. Here the four seat valves 30, 32, 34, 36 are arranged in the following connecting lines 50, 52, 54, 56.

A seat valve is located in the connecting line 50 between the piston end chamber of the upper right hydraulic cylinder 18 and the piston end chamber of the upper left hydraulic cylinder 20. A seat valve is located in the connecting line 52 between the piston end chamber of the lower right hydraulic cylinder 14 and the piston end chamber of the lower left hydraulic cylinder 12. A seat valve is located in the connecting line 54 between the rod end chamber of the upper right hydraulic cylinder 18 and the rod end chamber of the lower right hydraulic cylinder 14. A seat valve is located in the connecting line 56 between the rod end chamber of the upper left hydraulic cylinder 20 and the rod end chamber of the lower left hydraulic cylinder 12.

All seat valves 30, 32, 34, 36 are controlled together by a control signal, that can be transmitted by the operator, in such a way that all connecting lines 40, 42, 44, 46 or 50, 52, 54, 56 are simultaneously either open or closed. If, for example, after the insertion of an operating implement into the ground the free sideways pendulous movement of the implement attachment interface is to be activated, then the operator releases an electrical control signal over a floating position switch, not shown in any further detail, which is arranged in the operator's cab, which opens the seat valves 30, 32, 34, 36 (floating position). An exchange of fluid can now occur between the upper and lower hydraulic cylinders 12, 14, 18, 20 and the coupling frame 24 can deflect to the side as a result of sideways forces of the attached implement. The two cylinders 16, 22 at the sides are not included in the floating position valve arrangement and remain rigid or in unison depending on the individual case. Before the operating implement is again extracted the free sideways pendulous movement is switched off, in that the operator releases a corresponding control signal over the floating position switch through which the seat valves 30, 32, 34, 36 are closed and a fluid exchange between the hydraulic cylinders 12, 14, 18, 20 is no longer possible (control position). The deactivation of the sideways pendulous movement prevents the implement from pivoting back and forth during maneuvering on the headland or during transport operations.

For reasons of safety and in order to simplify the operation it is useful to turn on the seat valves 30, 32, 34, 36 as a function of the lift height. In this way a control arrangement can automatically activate the horizontal floating position at a certain lift height (for example, after the insertion of the first plow body into the ground) and to deactivate it upon the withdrawal of the plow as a function of a predetermined lift height. Thereby the operator is considerably relieved of his tasks. The operator turns on the automatic operation of the floating position at the beginning of the ground breaking operation and turns it off again at the end of the ground breaking operation.

If during the sideways pendulous movement to the left the upper left hydraulic cylinder 20 and/or the lower right hydraulic cylinder is completely retracted, the operating implement can no longer move to the side. Correspondingly if during the sideways pendulous movement to the right the upper right hydraulic cylinder 18 and/or the lower left hydraulic cylinder 12 is completely retracted, the operating implement cannot move any further to the side. This results in mechanical stops (complete retraction) of the upper right hydraulic cylinder 18 and/or the lower left hydraulic cylinder 12 during the pendulous movement to the right and mechanical stops of the upper left hydraulic cylinder 20 and/or lower right hydraulic cylinder 14 during the pendulous movement to the left.

These stops stabilize the implement attachment interface in the sideways direction. Therefore no additional sideways stabilizers are required for the sideways stabilization (nor are sideways stabilizers needed for transport operation). The free sideways path is a function of the initial position of the hydraulic cylinders 12 and 14 or 18 and 20.

Fundamentally it is possible to turn off the free sideways pendulous movement in certain sideways positions actively and independent of positions (that is independent of the immediate cylinder stops) of the hydraulic cylinders 12, 14, 18, 20. This makes it possible to limit the sideways floating path of the operating implement from the position of the operator's seat. By limiting the floating path problems can be removed, for example, during plowing along a slope, since a drifting off due to the force of gravity of the plow can be avoided, which could lead to a crooked furrow and an indented furrow wall.

The hydraulic circuit shown in FIG. 3 contains, in addition to the seat valves 30, 32, 34, 36 described above, through which piston end chambers and rod end chambers of the hydraulic cylinders 12, 14, 18, 20 can be connected or separated, six electromagnetically controlled control valves 62, 64, 66, 68, 70, 72. Each of these control valves 62, 64, 66, 68, 70, 72 is associated with one of the six hydraulic cylinders 12, 14, 16, 18, 20, 22 and selectively connects the piston end chamber or the rod end chamber of the hydraulic cylinder 12, 14, 16, 18, 20, 22 with the system pressure of a hydraulic pump 74 or with a non-pressurized reservoir 76. The control valves 62, 64, 66, 68, 70, 72 are controlled by a control arrangement, not described in any further detail, in order to move the coupling frame 24 and with it an attached operating implement into a certain position in space and an orientation, as is described in DE-A-199 51 840. The upper and the lower hydraulic cylinders 12, 14, 18, 20 are controlled only when the system is not in the floating position.

Moreover, the hydraulic circuit contains topping-off valves 78 that connect each piston end chamber and each rod end chamber of the hydraulic cylinders 12, 14, 16, 18, 20, 22 with the reservoir 76 and permit an exchange of fluid as long as the pressure in the hydraulic cylinder 12, 14, 16, 18, 20, 22 drops below the pressure in the reservoir 76. Furthermore each piston end chamber and each rod end chamber is connected with the reservoir 76 over an associated follower valve 80 that makes possible a drainage of the reservoir 76 when a limit pressure is exceeded in the piston end chamber or the rod end chamber.

Figure 4:
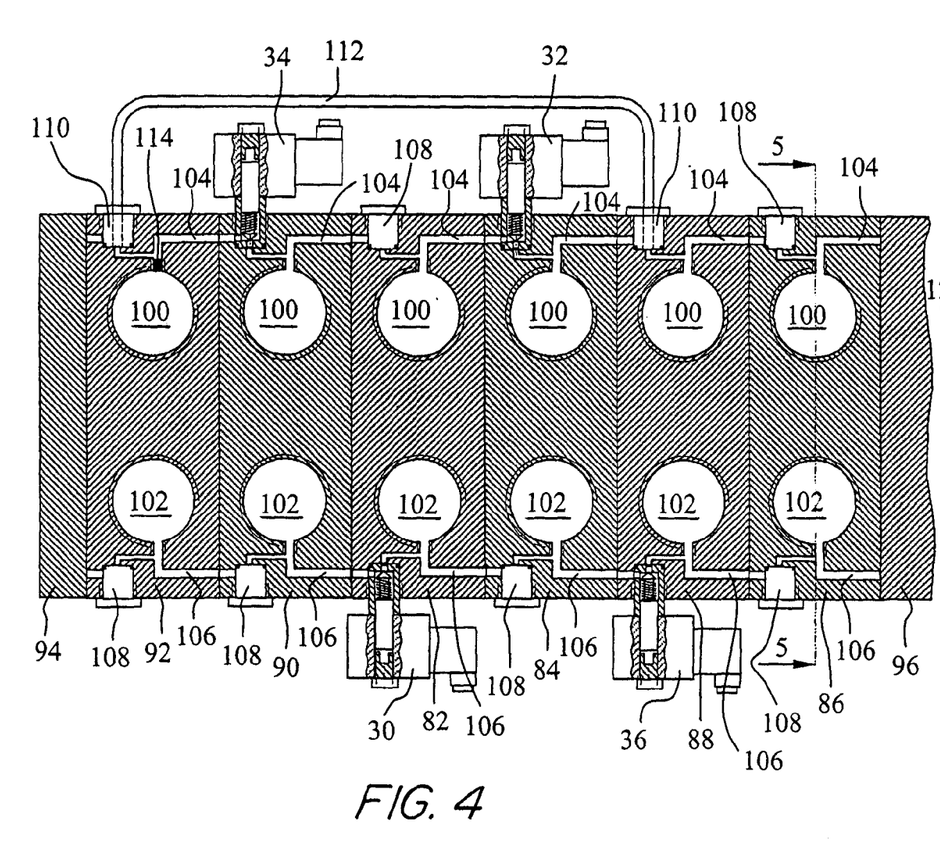
FIG. 4 shows a lengthwise section of a valve arrangement according to the invention; and, FIG. 5 shows a cross-sectional view of the valve arrangement of FIG. 4 along the line 5—5.
Figure 5:
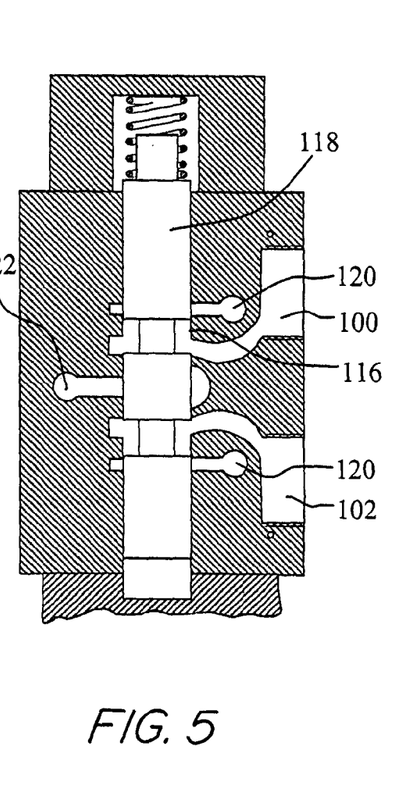

As can be seen in FIG. 4, each hydraulic cylinder 12, 14, 16, 18, 20, 22 is associated with its own valve module 82, 84, 86, 88, 90, 92. The association corresponds to the order of each of the number call-outs. The valve modules 82, 84, 86, 88, 90, 92 are arranged and sealed in one row alongside each other. At one end there is an end cover 94, at the other end a distributor cover 96 that is only indicated. The valve modules 82, 84, 86, 88, 90, 92 are provided with identical base bodies and differ from each other only in their equipment with varying plugs and valves.

Each valve module 82, 84, 86, 88, 90, 92 contains two chamber connections 100, 102 that are connected over lines, not shown in any further detail, with the piston end chamber or the rod end chamber of the associated hydraulic cylinder 12, 14, 16, 18, 20, 22. Connecting lines 104, 106 are provided in the valve modules 82, 84, 86, 88, 90, 92 that are used on the one hand for the connection 100 on the side of the rod end chamber and on the other hand the connections 102 of the piston end chamber connections. A component is inserted into each of these connecting lines 104, 106. These components are plugs 108, connecting inserts 110 or seat valves 30, 32, 34, 36. Each plug 108 closes the connecting line 104, 106 on both sides. A connecting insert 110 connects one side of the connecting line 104 with a connecting line 112 and closes the other side of the connecting line 104. For the sake of clarity the connecting line 112 is shown as an external connecting line. However, it is preferably configured as an internal bore or opening. The connecting line 104, 106 can be opened or closed by the seat valves 30, 32, 34, 36. The connection 100 is blocked to the valve module 92 by a closure 114 relative to the connecting line 104.

In addition to the hydraulic circuit arrangement described on the basis of FIG. 4 for the floating position, each valve module 82, 84, 86, 88, 90, 92 contains a valve bore 116 in which a control piston 118 is arranged so as to slide and forms a control valve 62, 64, 66, 68, 70, 72 whose method of operation has already been described. By sliding the control piston 118 the two connections 100, 102 can be closed or selectively connected with a sump connection 120 or a pump connection 122.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. An implement attachment interface for the coupling of operating implements to a utility vehicle with six double-acting hydraulic cylinders that can be repositioned in length and that are arranged in the manner of a hexapod between the utility vehicle and a coupling frame, that is provided with coupling means for the attachment of operating implements and that generally engage in the corners of a triangle on the side of the vehicle as well as the corners of a triangle on the side of the frame and that contain two upper hydraulic cylinders arranged alongside each other and that extend from one of the vehicle and the frame in a direction converging towards each other, two lower hydraulic cylinders that are arranged alongside each other and extend from the other of the vehicle and the frame in a direction converging towards each other as well as two hydraulic cylinders at the sides, wherein:

for a pendulous movement to the right the lower right hydraulic cylinder and the upper left hydraulic cylinder are hydraulically coupled to one another so as to extend synchronously with one another and the lower left hydraulic cylinder and the upper right hydraulic cylinder are hydraulically coupled to one another so as to retract synchronously with one another;

for a pendulous movement to the left the lower right hydraulic cylinder and the upper left hydraulic cylinder are hydraulically coupled to one another so as to retract synchronously with one another and the lower left hydraulic cylinder and the upper right hydraulic cylinder are hydraulically coupled to one another so as to extend synchronously with one another; and, wherein the retraction strokes are equal to the extension strokes.

2. An implement attachment interface according to claim 1, further comprising a valve arrangement through which chambers of the hydraulic cylinders can be connected.

3. An implement attachment interface according to claim 2, wherein the valve arrangement is integrated into a control valve arrangement.

4. An implement attachment interface according to claim 3, wherein each hydraulic cylinder is associated with a valve module that contains at least one element of the valve arrangement as well as at least one control valve associated with the hydraulic cylinders.

5. An implement attachment interface according to claim 4, wherein the valve arrangement is arranged such that:

the first chamber of the upper right hydraulic cylinder and the first chamber of the lower right hydraulic cylinder as well as, the first chamber of the upper left hydraulic cylinder and the first chamber of the lower left hydraulic cylinder as well as, the second chamber of the upper right hydraulic cylinder with the second chamber of the upper left hydraulic cylinder as well as, the second chamber of the lower right hydraulic cylinder with the second chamber of the lower left hydraulic cylinder, can be connected with each other.

6. An implement attachment interface according to claim 5, wherein each of the first chambers is the piston end chamber and each of the second chambers is the rod end chamber of the associated hydraulic cylinder.

7. An implement attachment interface according to claim 6, wherein a topping-off valve that is provided between at least one chamber of one of the hydraulic cylinders and a fluid reservoir makes possible a flow of fluid from the fluid reservoir to the hydraulic cylinder.

8. An implement attachment interface according to claim 7, wherein the extension strokes and/or the retraction strokes of the upper and the lower hydraulic cylinders are limited by defined cylinder stops in such a way that they limit the pendulous movement to the side and/or the pendulous angle to predetermined values.

9. An implement attachment interface according to claim 8, wherein the control valve arrangement includes one or more seat valves to automatically activate and or deactivate the horizontal floating position as a function of a stroke height signal, representing the actual stroke height of the coupling frame or of the operating implement.

10. An implement attachment interface according to claim 9, wherein a first input arrangement is provided through which the horizontal floating position can be activated and deactivated and a second input arrangement is provided through which a stroke height of the coupling frame or of the operating implement can be set as a target value for activating or deactivating the horizontal floating position.

11. A valve arrangement for an implement attachment interface comprising:
- a plurality of valves through which chamber connections can be made with each of a first and a second chamber of an upper and a lower hydraulic cylinders wherein;
- a first chamber of an upper right hydraulic cylinder can be selectively connected with a first chamber of a lower right hydraulic cylinder;
- a first chamber of an upper left hydraulic cylinder can be selectively connected with a first chamber of a lower left hydraulic cylinder;
- a second chamber of an upper right hydraulic cylinder can be selectively connected with a second chamber of an upper left hydraulic cylinder;
- a second chamber of a lower right hydraulic cylinder can be selectively connected with a second chamber of a lower left hydraulic cylinder, and,
- wherein the valves can be controlled together by a floating position signal.

12. A valve arrangement according to claim 11, further comprising a sump connection wherein each piston end chamber and each rod end chamber of each hydraulic cylinder is connected with a fluid reservoir by way of at least one topping-off valve that makes possible a flow of fluid from the chambers to the reservoir.

* * * * *